W. T. CLIFFORD-EARP.
RUBBER TIRE.
APPLICATION FILED APR. 26, 1920.

1,397,795.

Patented Nov. 22, 1921.

UNITED STATES PATENT OFFICE.

WALTER THOMAS CLIFFORD-EARP, OF BARNES, ENGLAND.

RUBBER TIRE.

1,397,795.     Specification of Letters Patent.     Patented Nov. 22, 1921.

Application filed April 26, 1920. Serial No. 376,736.

(GRANTED UNDER THE PROVISIONS OF THE ACT OF MARCH 3, 1921, 41 STAT. L., 1313.)

*To all whom it may concern:*

Be it known that I, WALTER THOMAS CLIFFORD-EARP, a subject of the King of Great Britain, and resident of Barnes, in the county of Surrey, England, have invented certain new and useful Improvements in and Relating to Rubber Tires, (for which I have filed an application in Great Britain April 9, 1919, Patent No. 143,359,) of which the following is a specification.

This invention relates to rubber tires of that general character where resiliency is obtained by constructing the tire of such a section that the walls of the tire, which embrace an air tight internal channel, tend to thicken and become displaced under load.

Tires have been constructed of gable section with the walls of the tire molded upon metal rings adapted to be presented on to a metal binding rim or a wheel periphery a thin rubber surface or liner being applied to the metal to insure air tight connection with the binding rim or wheel periphery.

The essential feature of my invention is to mold the tire integral with a circumferentially divided ring so that normally the half rings are separated but where the tire is applied to a wheel—or it may be a binding rim—under heavy pressure the half rings, and with them the walls of the tire are forced together and the material of the tire put in compressive stress this action also closing up the internal circumferential cavity the rubber being so arranged that an air tight joint is formed at the circumferential division of the ring.

This arrangement, has the advantage that the necessary action of pressing the tire on to the rim of the wheel also results in the energization or putting in stress of the rubber of the tire whereby increased resiliency is imparted to it. This will be understood when it is remembered that the act of closing the gap between the two rings tends to cause the tire to increase its diameter and circumferential measurement, and as this is not possible owing to the circumferential restraint consequent upon the tire being substantially inextensible circumferentially, the walls of the tire become compressed or displaced particularly adjacent the integral rings and energy is stored up, as it were, in the rubber which is thus normally under compression.

A further feature of the invention consists of so designing the section of the rubber that the load is transmitted from the outer tread to the wheel rim substantially through the center of the circumferential walls under all conditions of load, it being essential to my invention that the material of the tire bulges outwardly and not inwardly under load.

In accordance with the invention a thickness of highly vulcanized rubber is vulcanized to and at the base of the softer body of rubber. A tire thus formed consists of an undivided tread having two circumferential walls proceeding from it and terminating in a circumferentially divided ring forming circumferential rims. When the gap is closed by forcing the two rings together on to the rim of a wheel, the softer rubber located at the inner peripheral edges of the rings comes together and forms an air-tight joint, and the rubber is energized or put in compressive stress as before indicated. Moreover seeing that the tire is forced into position upon a rim or band of slightly larger diameter than the internal diameter of the tire under heavy hydraulic pressure an air tight joint must obviously be formed between the tire and its carrying rim.

In order that the invention may be clearly understood the same will now be fully described with reference to the accompanying drawings in which.

Figure 2:
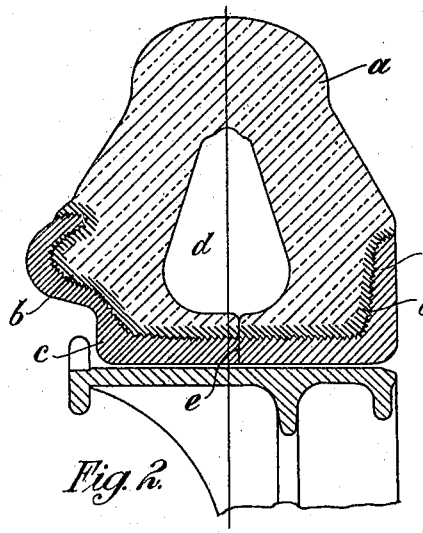
Fig. 2 is a transverse section through a wheel rim and tire.
Figure 1:
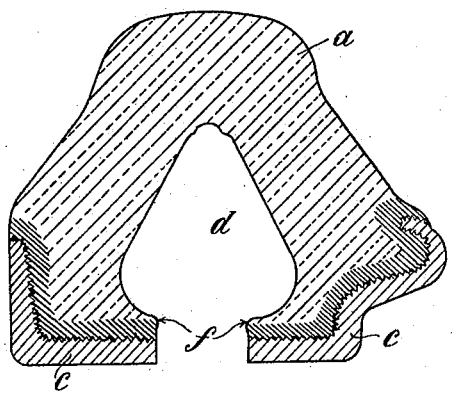
Figure 1 is a transverse section of a molded tire before application to its carrying rim.

Referring now particularly to Figs. 1 and 2 a represents the main body of the tire which is composed of soft rubber and b the two wall members which may be of highly vulcanized or hard rubber molded integral with the respective halves of a steel rim c. The walls of the tire embrace a circumferential channel d substantially of the section shown when the tire is fitted to the rim, which channel and the rims c are circumferentially divided as at e.

The section of this channel d as also the section of the main body of the tire is of great importance in assuring the attainment of the desired objects before mentioned in the opening statement. As will be seen from Fig. 2 of the drawings this channel when the tire is in position has its greatest width at the base, the increase continuing gradually from the top or narrow side while the points of mergence between the side walls of the channel and its base are constituted by curves of large radius. The object of these curves is to lessen the resistance to deformation at these points with the result that under load these corners become straightened out until they assume the different positions indicated roughly by dotted lines in Fig. 3. If the load were sufficiently great these corners would collapse to such an extent as to meet.

The top or normally narrow side of the channel is similarly curved but in this case the curve or curves are smaller. This configuration enables the top side to readily expand under compression until the same assumes one of the shapes set forth in Fig. 3.

The tread of the tire is domed or curved on a large radius as also are the points of mergence between such tread and the sides of the tire. This particular configuration of tread is of great importance when employed in conjunction with a channel of a cross section substantially as specified above.

Figure 3:
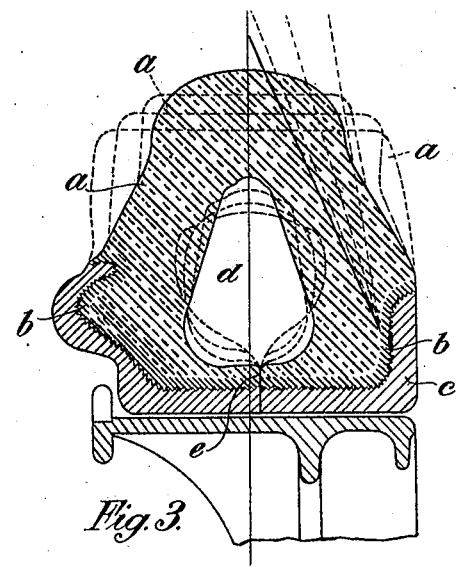
Fig. 3 is a similar view to Fig. 1 but showing the relative dispositions of the same under different loads.

The particular advantage of this section of tread obtains when under load inasmuch as the tire then expands outwardly at the point of road contact until the same assumes the different positions, depicted in Fig. 3, the degree of expansion depending of course upon the extent of the load. A result of this particular section of tire is that the mean direction of greatest load is from the outer tread to the wheel rim substantially through the center of the circumferential side walls under all conditions of load as is clearly demonstrated in Fig. 3 by the lines therein shown which are indicative of the direction of the thrust through one side of the tire under various loads.

To promote an air tight joint along the circumferential division e the cheeks f composed of the softer rubber project slightly beyond the cheeks of the two rings or ring portions b so that upon being forced together as when in position on the rim these soft cheeks close up tightly and thus constitute an air tight joint throughout the whole extent of the division.

Figure 4:
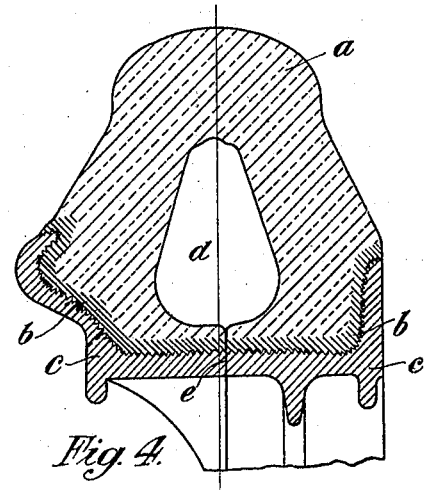
Fig. 4 is transverse section through a wheel and tire showing the application of the tire direction to the wheel rim without the intervention of a supplementary steel rim.
Figure 5:
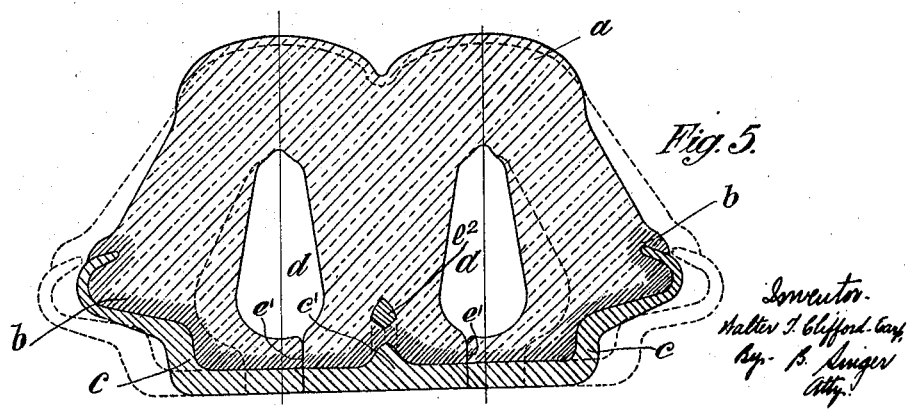
Fig. 5 is a view similar to Fig. 4 of a twin tire constructed in accordance with my invention.

In Fig. 4 the tire as just described is shown fitted direct to the rim of the wheel without the intervention of a supplementary metal rim, the two parts of the rim c being held together by any suitable means such as bolts or clamps, while in Fig. 5 a twin tire is shown constructed in accordance with my invention. It will be seen that in this case the circumferential ring is divided into three parts which when brought together form air tight joints at the divisions $e'$. The dotted lines indicate the approximate relative positions of the parts before the tire is forced on the wheel or rim and the full lines the position after the parts have been forced together as before described. In this case the load will be transmitted through the center or partition dividing the two channels $d'$ and also through the circumferential side walls a reinforcing ring is indicated at $e^2$. In all forms of the invention each side wall has its greatest width at the base or that portion which engages the rim and narrows progressively from the base portion to the tread.

What I claim and desire to secure by Letters Patent is:—

1. A solid rubber tire comprising a tread, side walls separated by an internal recess, an inner circumferential wall member having a circumferential division, a supporting inextensible member integrally associated with the inner circumferential wall, said supporting inextensible member also having a circumferential division corresponding to the circumferential division of the inner circumferential wall of the tire so that prior to the assembly for use the two parts of the inner circumferential wall are separated whereby when two parts of the inextensible member are caused to approach each other the material of the tire is put in compressive stress and an air tight joint is formed, substantially as described.

2. A solid rubber tire comprising a tread, side walls separated by an internal recess, an inner circumferential wall, an inner circumferential division, a supporting inextensible ring integrally associated with the inner circumferential wall, said supporting inextensible ring also having a circumferential division corresponding to the circumferential division of the inner circumferential wall of the tire and presenting cheeks, said tire having overhanging annular cheeks of soft rubber projecting slightly beyond the cheeks of the inextensible ring members and adapted to come into abutment when the tire is assembled in the tire carrying rim and an air-tight joint is formed by the abutment of the overhanging annular cheeks, substantially as described.

3. A solid rubber tire comprising treads, side walls, a central divisional wall, internal recesses separating said side walls from said central divisional wall, an inner circumferential wall having circumferential divisions, a supporting inextensible member integrally associated with the inner circumferential wall, said supporting inextensible member also having circumferential divisions corresponding to the circumferential divisions of the inner circumferential wall so that prior to assembly for use the parts of the inner circumferential wall are separated whereby when the parts of the inextensible member are caused to approach each other the material of the tire is put in compressive stress and air-tight joints are formed substantially as described.

In witness whereof I affix my signature.

WALTER THOMAS CLIFFORD-EARP.